United States Patent
Hirama et al.

(10) Patent No.: US 10,839,774 B2
(45) Date of Patent: Nov. 17, 2020

(54) CONTENT PROVIDING APPARATUS AND COMPUTER PROGRAM

(71) Applicant: Toshiba Tec Kabushiki Kaisha, Tokyo (JP)

(72) Inventors: Mika Hirama, Tokyo (JP); Akihiko Fujiwara, Kawasaki Kanagawa (JP); Masami Takahata, Tokyo (JP); Ryuichi Aoyama, Mishima Shizouka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/179,494

(22) Filed: Nov. 2, 2018

(65) Prior Publication Data

US 2019/0147833 A1    May 16, 2019

(30) Foreign Application Priority Data

Nov. 14, 2017  (JP) ................. 2017-219167

(51) Int. Cl.
| | | |
|---|---|---|
| G09G 5/377 | (2006.01) | |
| G06Q 30/02 | (2012.01) | |
| H04L 29/06 | (2006.01) | |
| G09G 5/373 | (2006.01) | |
| G09G 5/38 | (2006.01) | |

(52) U.S. Cl.
CPC ......... *G09G 5/377* (2013.01); *G06Q 30/0241* (2013.01); *G06Q 30/0268* (2013.01); *G06Q 30/0276* (2013.01); *G06Q 30/0277* (2013.01); *G09G 5/373* (2013.01); *G09G 5/38* (2013.01); *G09G 2340/0492* (2013.01); *G09G 2340/125* (2013.01); *G09G 2354/00* (2013.01); *G09G 2370/02* (2013.01); *G09G 2380/06* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 2008/0183578 A1 | 7/2008 | Lipscomb | |
| 2011/0295720 A1* | 12/2011 | Parikh | G06Q 30/06 705/27.1 |
| 2012/0084807 A1 | 4/2012 | Thompson et al. | |
| 2013/0246169 A1* | 9/2013 | Berry | G06O 30/0276 705/14.49 |
| 2015/0088621 A1 | 3/2015 | Shinohara et al. | |
| 2017/0178223 A1* | 6/2017 | Ranasinghe | G06Q 30/0271 |

FOREIGN PATENT DOCUMENTS

JP    2015-088170 A    5/2015

OTHER PUBLICATIONS

Search Report dated Mar. 14, 2019, received in corresponding European application No. 18 20 5362.9, 7 pages.

* cited by examiner

*Primary Examiner* — Nicholas R Wilson
(74) *Attorney, Agent, or Firm* — Foley & Lardner LLP

(57) ABSTRACT

A content providing apparatus includes a selecting unit, a setting unit, and an output unit. The selecting unit selects additional information output while being superimposed on content output to a display device. The setting unit sets the additional information selected by the selecting unit in any position overlapping the content. The output unit outputs the content, for which the additional information is set by the setting unit, to the display device.

20 Claims, 14 Drawing Sheets

| CONTENT No. | 1 | 2 | 3 |
|---|---|---|---|
| TYPE CODE | | | |
| CONTENT DATA | | | |
| REPRODUCTION TIME | | | |
| STAMP DATA | | | |
| CENTER COORDINATE | | | |
| ROTATION ANGLE | | | |
| SIZE | | | |

CONTENT PROVIDING APPARATUS AND COMPUTER PROGRAM

CROSS-REFERENCE TO RELATED APPLICATION

This application is based upon and claims the benefit of priority from Japanese Patent Application No. 2017-219167, filed in Nov. 14, 2017, the entire contents of which are incorporated herein by reference.

FIELD

Embodiments described herein relate generally to a content providing apparatus and a computer program for causing a computer to function as the content providing apparatus.

BACKGROUND

A technique is known for distributing contents such as still images and moving images from a server to a plurality of display devices via a network and displaying a plurality of contents in order in the display devices. If such a technique is used as an advertisement medium in a chain of stores, the display devices are set in the stores and the server is set in a head office. Contents including advertisement images of commodities are distributed from the server of the head office to the display devices in the stores. Consequently, advertisement images and the like of the same commodities can be shown to customers in the stores.

On the other hand, there is concern that an advertisement of a sold-out commodity in a certain store continues to be displayed. Some store desires to emphasize that a commodity of an advertise image is a target commodity of a time-limited sale. Such problems can be solved if information such as "sold-out" and "time-limited sale" can be added, on a real time basis, to contents displayed on the display devices.

DETAILED DESCRIPTION

An object is to provide a content providing apparatus and a computer program that can add, on a real time basis, additional information to contents displayed on a display device.

In general, according to at least one embodiment, a content providing apparatus includes a selecting unit, a setting unit, and an output unit. The selecting unit selects additional information output while being superimposed on content output to a display device. The setting unit sets the additional information selected by the selecting unit in any position overlapping the content. The output unit outputs the content, for which the additional information is set by the setting unit, to the display device.

A content providing apparatus according to at least one embodiment that can add, on a real time basis, additional information to contents displayed on a display device is explained below with reference to the drawings. In at least one embodiment, a content providing apparatus for causing display devices set in stores of a chain to respectively display advertisement images and the like of commodities is illustrated.

Figure 1:
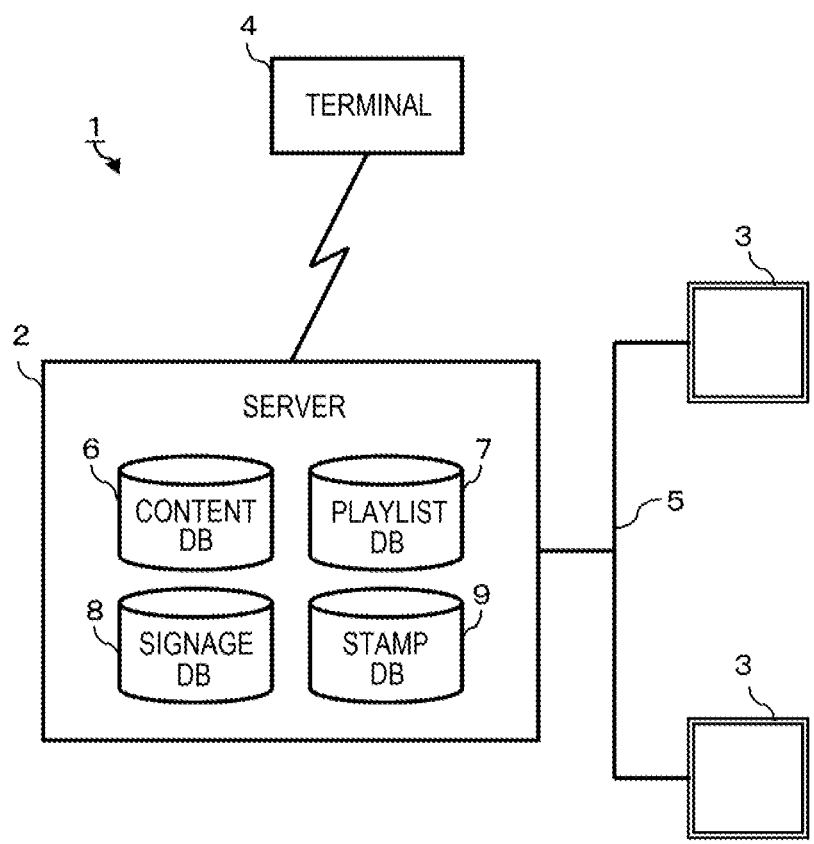
FIG. 1 is a schematic configuration diagram of a content providing system according to at least one embodiment.

FIG. 1 is a schematic configuration diagram of a content providing system 1 according to this embodiment. The content providing system 1 includes a server 2, a plurality of signage terminals 3, and a terminal 4. The server 2 functions as a content providing apparatus in this embodiment. The server 2 is set in a head office of the chain. The server 2 may be a cloud server (cloud computing) created in a cloud environment.

The signage terminals 3 are an example of display devices. The signage terminals 3 are respectively set in the stores of the chain. The signage terminals 3 include liquid crystal displays, plasma displays, or video projectors. The signage terminals 3 display contents such as still images, moving images, and templates. The templates are texts and images fit in predetermined formats. The server 2 and the signage terminals 3 are connected via a network 5. The network 5 is a wide area network such as the Internet or a telephone network. The network 5 may be formed by combining the wide area network with a wired LAN (Local Area Network), a wireless LAN, or the like.

The terminal 4 is an example of an input device. The terminal 4 is a wireless communication terminal capable of performing data communication using wireless communication with the server 2. The terminal 4 is used in the stores.

A notebook personal computer, a desktop personal computer, a tablet terminal, a smartphone, and the like can be the terminal 4.

The server 2 manages a content database 6, a playlist database 7, a signage database 8, and a stamp database 9. The content database 6 saves a data record 6R (see FIG. 2) concerning content. The playlist database 7 saves a data record 7R (see FIG. 3) concerning a playlist. The playlist is a listed form of order for reproducing contents. The signage database 8 saves a data record 8R (see FIG. 4) concerning the signage terminals 3. The stamp database 9 saves a data record 9R (see FIG. 5) concerning a stamp. The stamp is a type of additional information output while being superimposed on content. The stamp may be image information such as "sold-out" or "time-limited sale" displayed on the content. The stamp may be animation information or moving image information displayed involving movement on the content. The stamp may be voice information reproduced as voice on the content or may be sound information reproduced as alarm sound, sound effects, background sound, or the like on the content.

Figure 2:
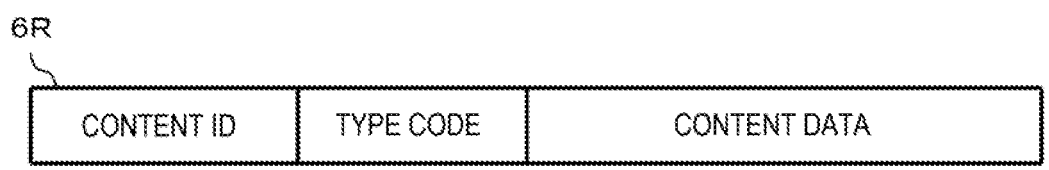
FIG. 2 is a schematic diagram illustrating a main data structure of a data record concerning content.

FIG. 2 is a schematic diagram illustrating a main data structure of the data record 6R concerning content. As illustrated in FIG. 2, the data record 6R includes a content ID, a type code, and content data. The content ID is a unique code set for each of contents such as still images, moving images, and templates. The type code is a code for identifying a type of content, that is, a still image, a moving image, a template, or the like. The content data is data displayed as content on the signage terminal 3. If the type of the content is the still image, the content data is data related to the still image. If the type of the content is the moving image, the content data is data related to the moving image. If the type of the content is the template, the content data is data related to the template.

Figure 3:
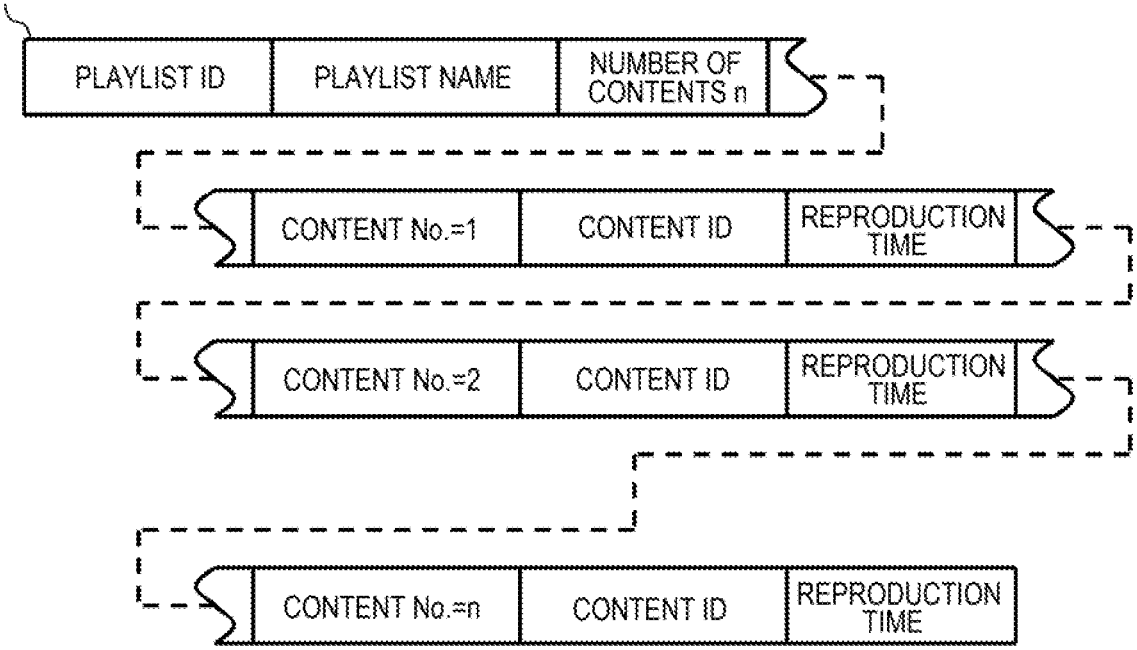
FIG. 3 is a schematic diagram illustrating a main data structure of a data record concerning a playlist.

FIG. 3 is a schematic diagram illustrating a main data structure of the data record 7R concerning a playlist. As illustrated in FIG. 3, the data record 7R includes a playlist ID, a playlist name, the number of contents n, and playlist data. The playlist ID is a unique code set for each playlist. The playlist name is a peculiar name set for each playlist. The number of contents n is the number of contents included in the playlist.

The playlist data is data for which content IDs and reproduction times are set in the order of content numbers 1 to n. The content number is order for reproducing contents. The reproduction time is a time for reproducing the contents. Therefore, the playlist data indicates that content specified by the content ID of the content number=1 is reproduced for the reproduction time first and, subsequently, content specified by the content ID of the content number=2 is reproduced for the reproduction time. If content specified by the content ID of the content number=n is reproduced for the reproduction time, the reproduction returns to the reproduction of the content specified by the content ID of the content number=1. Incidentally, the reproduction time is fixed in the case of the moving image. However, the reproduction time is optionally set in the case of the still image and the template. In this embodiment, display of not only the moving image but also the still image and the template on the signage terminals 3 is also referred to as reproduction.

Figure 4:
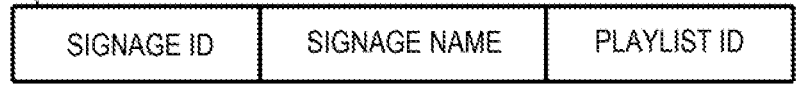
FIG. 4 is a schematic diagram illustrating a main data structure of a data record concerning a signage.

FIG. 4 is a schematic diagram illustrating a main data structure of the data record 8R concerning a signage. As illustrated in FIG. 4, the data record 8R includes a signage ID, a signage name, and a playlist ID. The signage ID is a unique code set for each signage terminal 3. The signage name is a peculiar name set for each signage terminal 3. The playlist ID is an ID of a playlist reproduced in the signage terminal 3.

Figure 5:
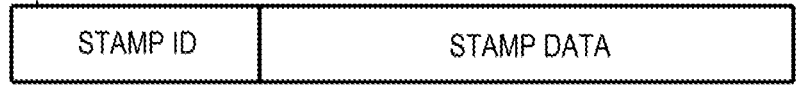
FIG. 5 is a schematic diagram illustrating a main data structure of a data record concerning a stamp.

FIG. 5 is a schematic diagram illustrating a main data structure of the data record 9R concerning a stamp. As illustrated in FIG. 5, the data record 9R includes a stamp ID and stamp data. The stamp ID is a unique code set for each stamp. The stamp data is image information, animation information or moving image information, voice information, sound information, or the like used as the stamp.

Figure 6:
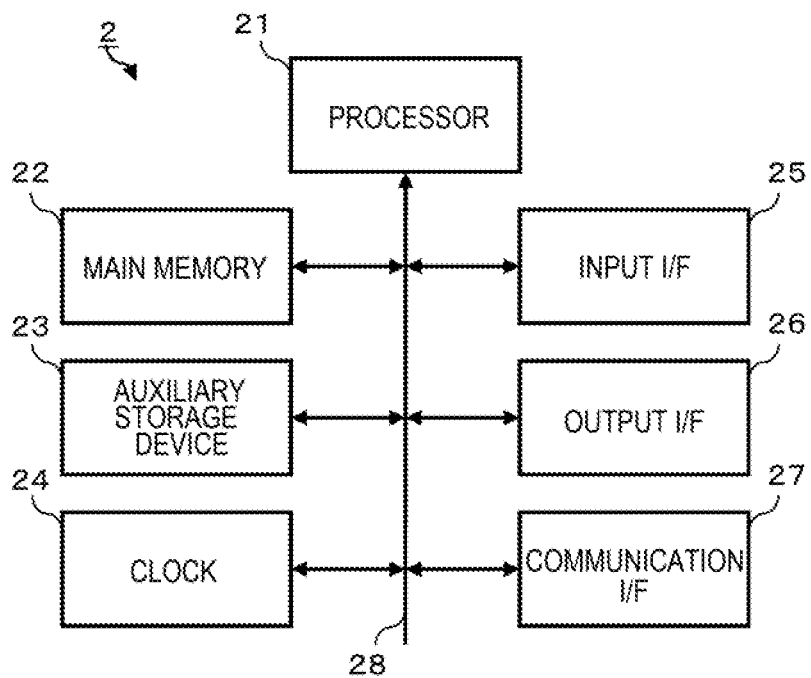
FIG. 6 is a block diagram illustrating an essential circuit configuration of a server.

FIG. 6 is a block diagram illustrating a circuit configuration of the server 2. The server 2 includes a processor 21, a main memory 22, an auxiliary storage device 23, a clock 24, an input interface 25, an output interface 26, a communication interface 27, and a system bus 28. The server 2 is configured by connecting the processor 21, the main memory 22, the auxiliary storage device 23, the clock 24, the input interface 25, the output interface 26, and the communication interface 27 to the system bus 28 directly or via a signal input and output circuit. In the server 2, a computer is configured by the processor 21, the main memory 22, and the auxiliary storage device 23 and the system bus 28 that connects the processor 21, the main memory 22, and the auxiliary storage device 23.

The processor 21 is equivalent to a central portion of the computer. The processor 21 controls the units in order to realize various functions of the server 2 according to an operating system and application programs.

The main memory 22 is equivalent to a main storage portion of the computer. The main memory 22 includes a nonvolatile memory region and a volatile memory region. The main memory 22 stores the operating system and the application programs in the nonvolatile memory region. The main memory 22 sometimes stores, in the nonvolatile or volatile memory region, data necessary for the processor 21 to execute processing for controlling the units. The main memory 22 uses the volatile memory region as a work area in which data is rewritten as appropriate by the processor 21.

The auxiliary storage device 23 is equivalent to an auxiliary storage portion of the computer. For example, an EEPROM (Electric Erasable Programmable Read-Only Memory), a HDD (Hard Disc Drive), or a SSD (Solid State Drive) is used as the auxiliary storage device 23. The auxiliary storage device 23 saves data used by the processor 21 to perform various kinds of processing and data generated by the processing in processor 21. The auxiliary storage device 23 sometimes stores the application programs. The auxiliary storage device 23 stores the databases 6 to 9.

The clock 24 functions as a time information source of the server 2. The processor 21 clocks time on the basis of time information clocked by the clock 24. The input interface 25 captures various data input from an information processing apparatus such as a personal computer. The output interface 26 outputs content data to the signage terminals 3 connected by the network 5. The communication interface 27 performs data communication with the terminal 4 according to a predetermined communication protocol.

Figures 7, 8:
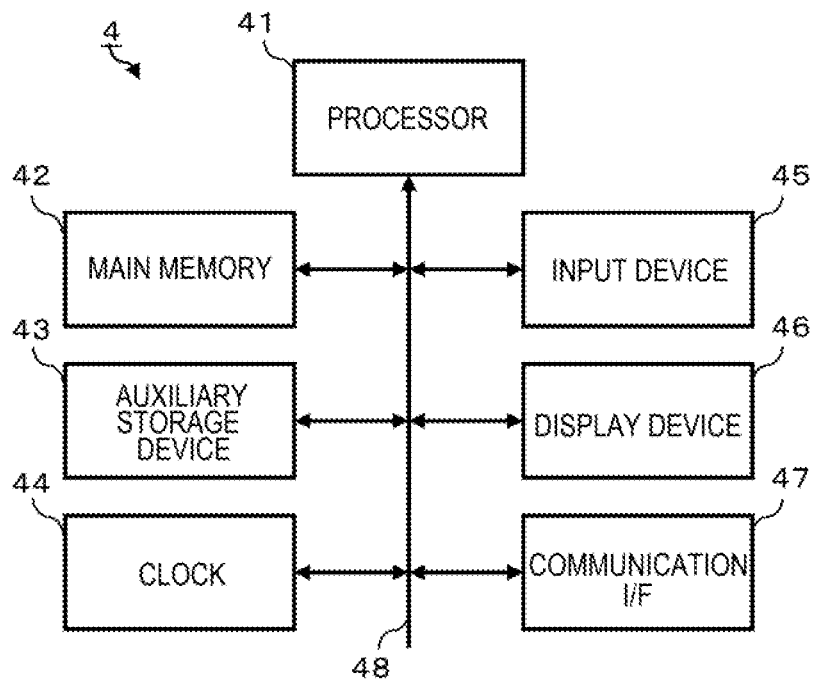
FIG. 7 is a block diagram illustrating an essential circuit configuration of a terminal.
FIG. 8 is a schematic diagram illustrating an example of an editing table.

FIG. 7 is a block diagram illustrating a circuit configuration of the terminal 4. The terminal 4 includes a processor 41, a main memory 42, an auxiliary storage device 43, a clock 44, an input device 45, a display device 46, a communication interface 47, and a system bus 48. The terminal 4 is configured by connecting the processor 41, the main memory 42, the auxiliary storage device 43, the clock 44, the input device 45, the display device 46, and the communication interface 47 to the system bus 48 directly or via a signal input and output circuit. In the terminal 4, a computer is configured by the processor 41, the main memory 42, and the auxiliary storage device 43 and the system bus 48 that connects the processor 41, the main memory 42, and the auxiliary storage device 43.

The processor 41 is equivalent to a central portion of the computer. The processor 41 controls the units in order to realize various functions of the terminal 4 according to an operating system and application programs.

The main memory 42 is equivalent to a main storage portion of the computer. The main memory 42 includes a nonvolatile memory region and a volatile memory region. The main memory 42 stores the operating system and the application programs in the nonvolatile memory region. The main memory 42 stores the operating system and the application programs in the nonvolatile memory region. The main memory 42 sometimes stores, in the nonvolatile or volatile memory region, data necessary for the processor 41 to execute processing for controlling the units. The main memory 42 uses the volatile memory region as a work area in which data is rewritten as appropriate by the processor 41.

The auxiliary storage device 43 is equivalent to an auxiliary storage portion of the computer. For example, an EEPROM, a HDD, or a SSD is used as the auxiliary storage device 43. The auxiliary storage device 43 saves data used by the processor 41 to perform various kinds of processing and data generated by the processing in the processor 41. The auxiliary storage device 43 sometime stores the application programs.

The clock 44 functions as a time information source of the terminal 4. The processor 41 clocks time on the basis of time information clocked by the clock 44. The input device 45 is, for example, a keyboard, a pointing device, or a touch sensor. The display device 46 is, for example, a liquid crystal display or a touch panel. The communication interface 47 performs data communication with the server 2 according to a predetermined communication protocol.

The terminal 4 having such a configuration is used if a stamp, which is a kind of additional information, is superimposed and displayed, on a real time basis, on contents displayed on the signage terminals 3. A dedicated application program served for this use is installed in the terminal 4. The application program is stored in the main memory 42 and the auxiliary storage device 43.

On the other hand, the server 2 includes a control program for superimposing and displaying the stamp on content according to an instruction from the terminal 4. That is, the server 2 executes the control program to thereby function as a content providing apparatus that can add, on a real time basis, additional information to the contents displayed on the signage terminals 3. The control program is stored in the main memory 22 or the auxiliary storage device 23.

In general, the server 2 is transferred in a state in which the control program is stored in the main memory 22 or the auxiliary storage device 23. However, the server 2 is sometimes transferred in a state in which the control program is not stored in the main memory 22 or the auxiliary storage device 23. In this case, the control program is recorded in a removable recording medium such as a magnetic disk, a magneto-optical disk, an optical disk, or a semiconductor memory and transferred. Alternatively, the control program may be transferred via a network and written in the auxiliary storage device 23 of the separately transferred server 2.

FIGS. 9 to 13 are flowcharts illustrating an essential procedure of information processing executed by the processor 21 of the server 2 according to the control program.

FIGS. 14 to 17 are examples of images displayed on the display device 46 of the terminal 4 in the information processing.

The operation of the server 2 performed if a user uses the terminal 4 to superimpose and display a desired stamp on content of the signage terminal 3 of a store where the user is present. The user is, for example, a store manager or a person responsible for management of the signage terminal 3. Content of processing explained below is an example. Various kinds of processing capable of obtaining the same result can be used as appropriate.

First, the user operates the input device 45 of the terminal 4 to start the application program. Then, the terminal 4 changes to an input mode for a signage ID. Therefore, the user inputs a signage ID of the signage terminal 3. For example, a label on which a barcode representing the signage ID is printed is attached to the signage terminal 3. The user inputs the signage ID by reading the barcode of the label with a scanner, which is a type of an input device.

If the signage ID is input, an editing request command is transmitted from the terminal 4 to the server 2. The editing request command is a command for requesting editing of content displayed on the signage terminal 3, that is, superimposition of a stamp on the content. The signage ID is included in the editing request command.

Figure 9:
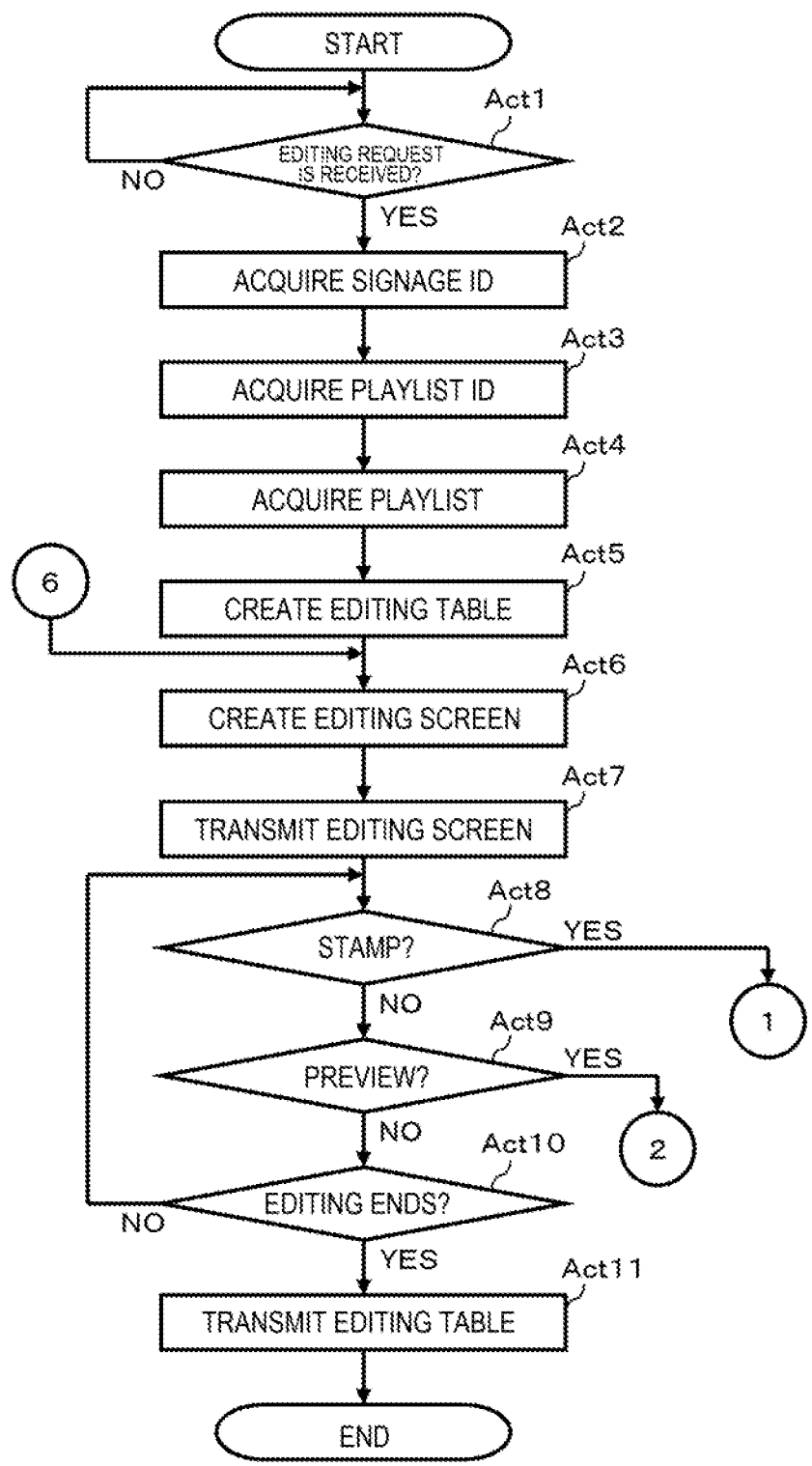
FIG. 9 is a flowchart illustrating an essential procedure of information processing executed by a processor of the server according to a control program.

As illustrated in FIG. 9, in Act 1, the processor 21 of the server 2 waits for an editing request command. If an editing request command is received via the communication interface 27 (YES in Act 1), in Act 2, the processor 21 acquires the signage ID from the editing request command. Subsequently, in Act 3, the processor 21 searches through the signage database 8 and acquires a playlist ID from the data record 8R including the acquired signage ID.

If acquiring the playlist ID, in Act 4, the processor searches through the playlist database 7 and acquires playlist data from the data record 7R including the playlist ID. In Act 5, the processor 21 creates an editing table 221 (see FIG. 8) on the basis of the acquired playlist data. The editing table 221 is formed in the volatile memory region of the main memory 42.

FIG. 8 is a schematic diagram illustrating an example of the editing table 221. The illustrated editing table 221 is based on playlist data with content numbers "1" to "3". As illustrated in FIG. 8, the editing table 221 includes, for each of the content numbers "1", "2", and "3", areas for storing data of a type code, content data, a reproduction time, stamp data, a center coordinate, a rotation angle, and a size. The center coordinate, the rotation angle, and the size are data related to the stamp data.

The processor 21 acquires content IDs and reproduction times respectively associated with the content numbers "1", "2", and "3" from the playlist data. The processor 21 searches through the content database 6 and acquires type codes and content data from the data record 6R including the acquired content IDs. The processor 21 sets the acquired type codes, the acquired content data, and the acquired reproduction times in type code areas, content data areas, and reproduction time areas respectively corresponding to the content numbers "1", "2", and "3" of the editing table 221.

Incidentally, at this point in time, stamp data areas, center coordinate areas, rotation angle areas, and size areas are blank. Data of the editing table 221 at this point in time is transmitted to the signage terminal 3. Consequently, in the signage terminal 3, contents of the content data are reproduced for the reproduction times in the order of the content numbers "1", "2", and "3".

Referring back to FIG. 9, if finishing to create the editing table 221, in Act 6, the processor 21 creates editing screen data on the basis of the data of the editing table 221. In Act 7, the processor 21 controls the communication interface 47 to transmit the editing screen data to the terminal 4 at an editing request command transmission source. The editing screen data is transmitted from the communication interface 47 to the terminal 4 according to the control. Consequently, an editing screen S1 (see FIG. 14) is displayed on the display device 46 of the terminal 4.

Figure 14:
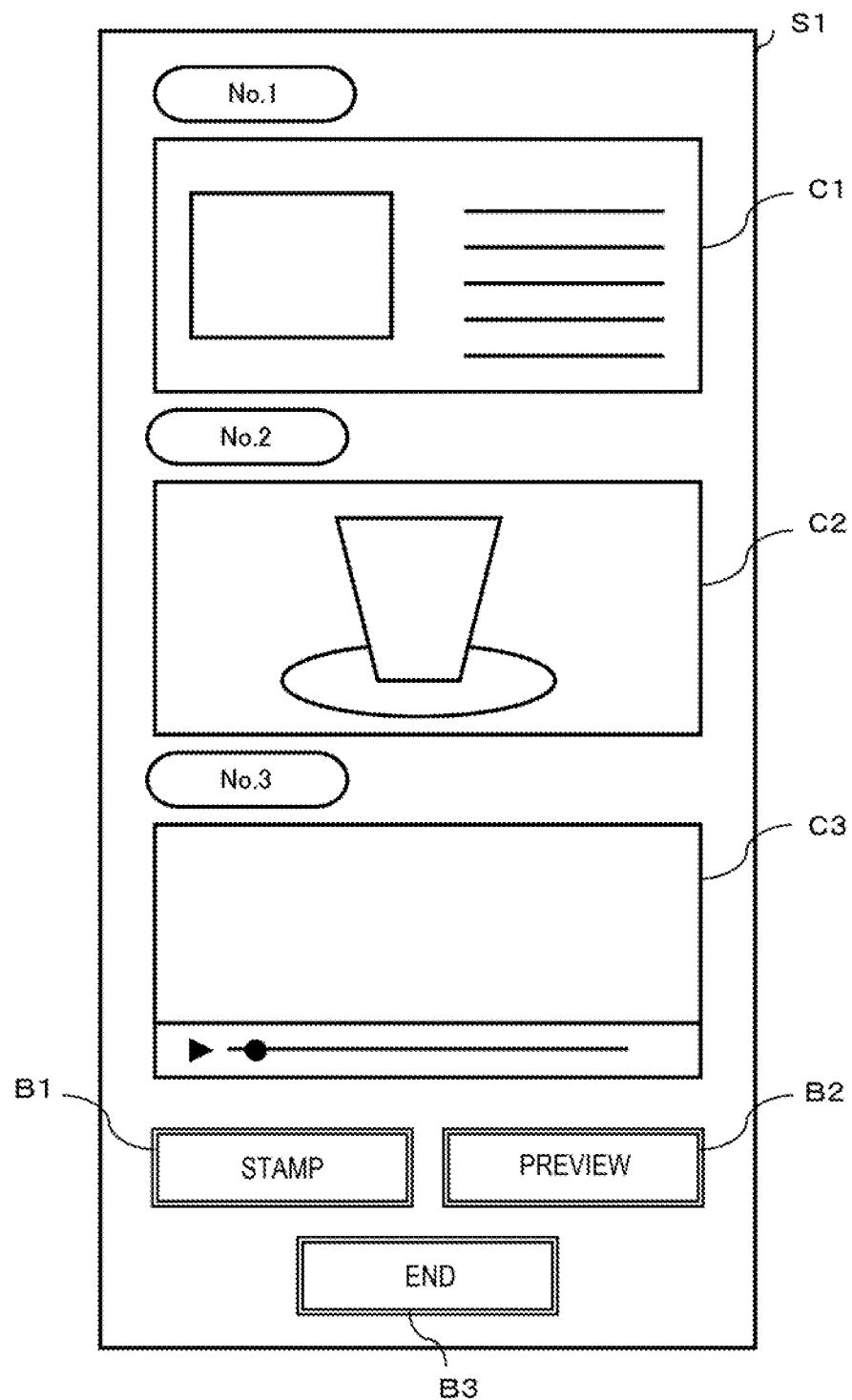
FIG. 14 is a schematic diagram illustrating an example of an editing screen.

FIG. 14 illustrates an example of the editing screen S1. As illustrated in FIG. 14, the editing screen S1 includes content C1, content C2, and content C3, a stamp button B1, a preview button B2, and an end button B3. All of the contents C1, C2, and C3 are displayed in rectangular frames having fixed longitudinal and lateral sizes. Incidentally, in the content C1, a template is illustrated as the content of the content data set in the content data area corresponding to the content number "1" of the editing table 221. In the content C2, a still image is illustrated as the content of the content data set in the content data area corresponding to the content number "2" of the editing table 221. In the content C3, a moving image is illustrated as the content of the content data set in the content data area corresponding to the content number "3" of the editing table 221.

The user confirming the editing screen S1 operates the input device 45 to enter the stamp button B1. Then, a stamp command is transmitted from the terminal 4 to the server 2.

Referring back to FIG. 9, in Act 8, the processor 21 that transmits the editing screen data in Act 7 confirms whether a stamp command is received. If a stamp command is not received (NO in Act 8), in Act 9, the processor 21 confirms whether a preview command is received. If a preview command is not received (NO in Act 9), in Act 10, the processor 21 confirms whether an editing end command is received. If an editing end command is not received (NO in Act 10), the processor 21 returns to Act 8. In this way, in Act 8 to Act 10, the processor 21 waits for any one of the stamp command, the preview command, and the editing end command.

Figure 10:
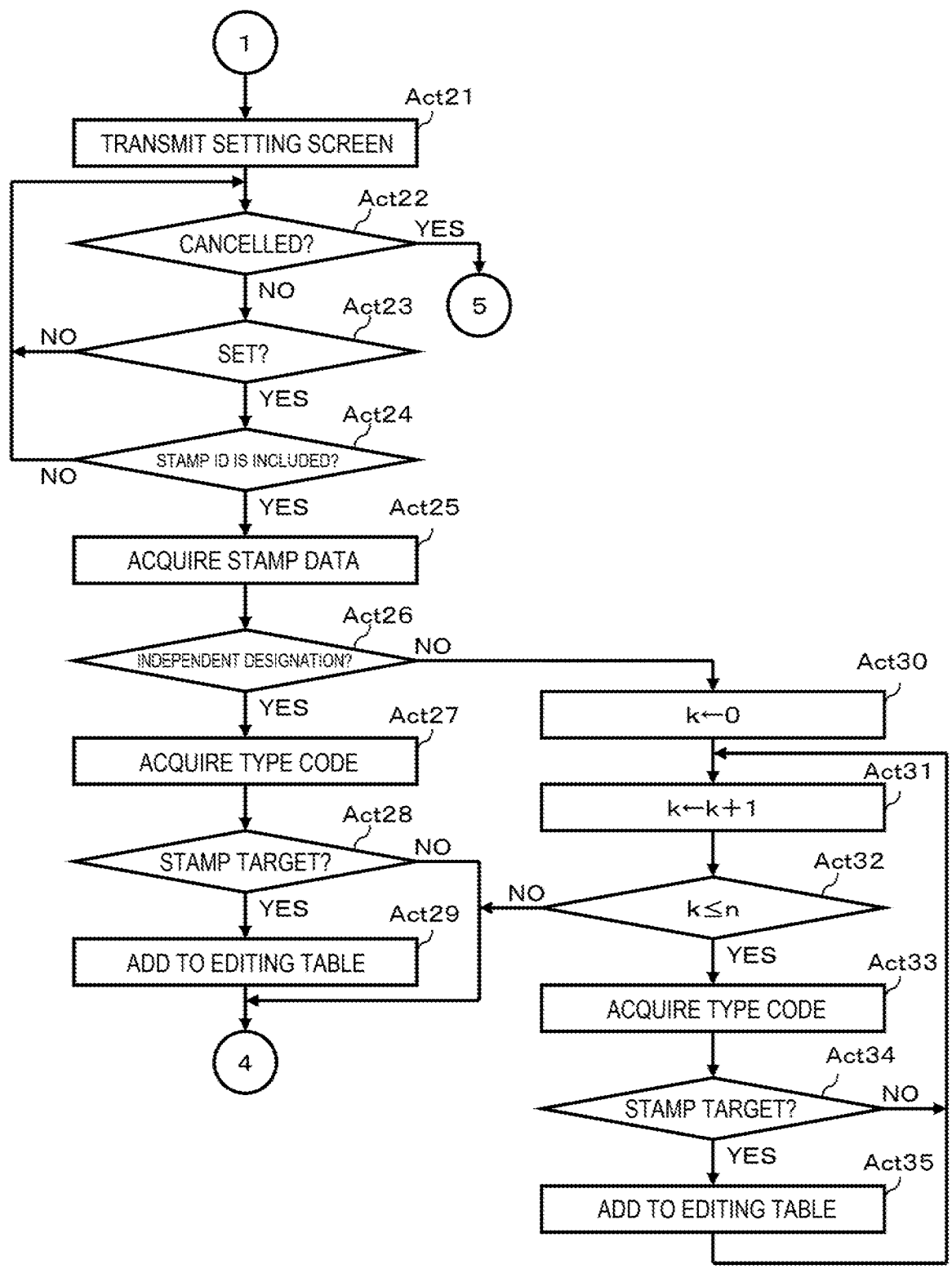
FIG. 10 is a flowchart illustrating the essential procedure of the information processing executed by the processor of the server according to the control program.

If a stamp command is received via the communication interface 27 in the waiting state in Act 8 to Act 10 (YES in Act 8), the processor 21 proceeds to processing in Act 21 in FIG. 10. That is, the processor 21 controls the communication interface 47 to transmit setting screen data to the terminal 4 at a stamp command transmission source. The setting screen data is transmitted from the communication interface 47 to the terminal 4 according to the control. Consequently a setting screen S2 (see FIG. 15) is displayed on the display device 46 of the terminal 4.

Figure 15:
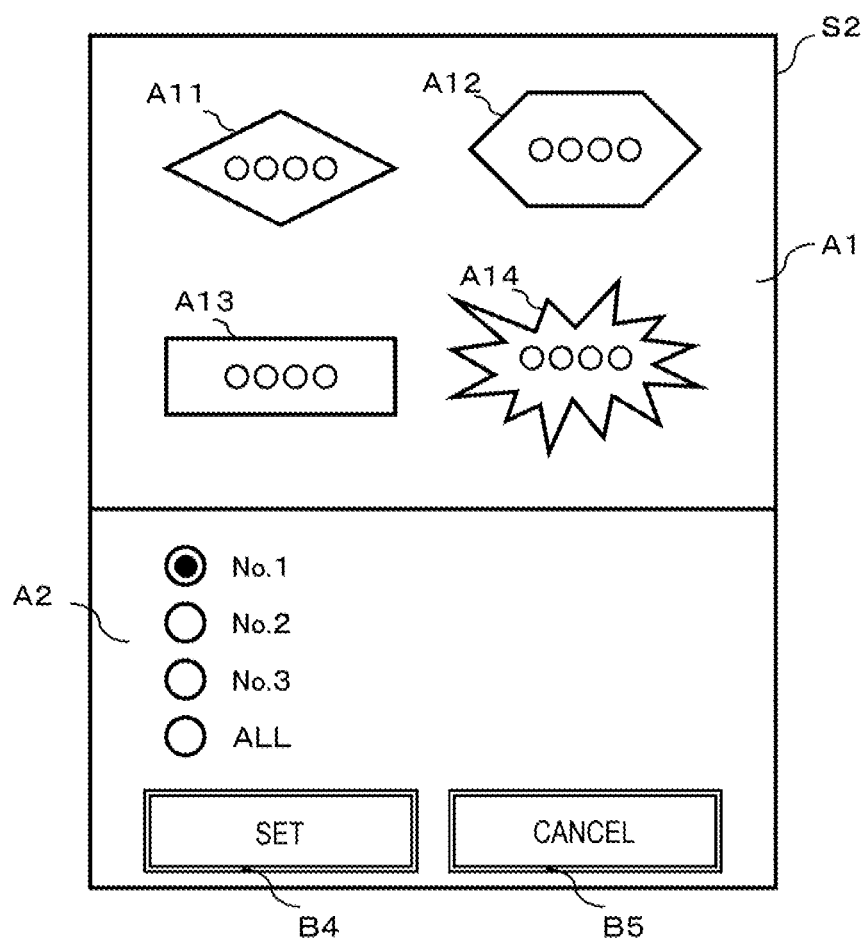
FIG. 15 is a schematic diagram illustrating an example of a setting screen.

FIG. 15 is a schematic diagram illustrating an example of the setting screen S2. As illustrated in FIG. 15, the setting screen S2 includes a stamp region A1, a radio button region A2, a setting button B4, and a cancellation button B5.

In the stamp region A1, stamps A11, A12, A13, and A14 of the stamp data registered in the stamp database 9 are displayed. The stamps A11, A12, A13, and A14 are formed by characters such as "sold-out" and "time-limited sale" and frames having various shapes surrounding the characters. Four stamps A11, A12, A13, and A14 are displayed in the screen example in FIG. 15. However, the number of stamps is not limited to four. Therefore, if not all of the stamps can be displayed in the stamp region A1, a next-page button and a previous-page button are displayed in the stamp region A1. Pages of the stamp region A1 are switched by operation of these buttons to display a larger number of stamps in the stamp region A1.

In the radio button region A2, number buttons respectively corresponding to the content numbers stored in the editing table 221 and an ALL button meaning all of the content numbers are displayed. Incidentally, in the screen example in FIG. 15, in Act 5, the editing table 221 with the content numbers "1" to "3" is created.

The user confirming the setting screen S2 operates the input device 45 to select a stamp superimposed and displayed on the content out of the stamps displayed in the stamp region A1. The user operates the input device 45 to select a number button corresponding to a number of the content on which the selected stamp is displayed from the radio button region A2. At this time, if the user displays the same stamp on all contents, the user selects the ALL button. If the user finishes the selection of the stamp and the radio button in this way, the user operates the input device 45 to enter the setting button B4.

If the setting button B4 is entered, a setting command is transmitted from the terminal 4 to the server 2. A stamp ID of the stamp selected from the stamp region A1 and the content number selected from the radio button region A2 are included in the setting command. For example, if a button of the content number "1" is selected, the content number "1" is included in the setting command. Similarly, if a button of the content number "2" is selected, the content number "2" is included in the setting command. If the ALL button is selected, "0" is included in the setting command as the content number.

In Act 22, the processor 21 that transmits the setting screen data in Act 21 confirms whether a cancellation command is received. If a cancellation command is not received (NO in Act 22), in Act 23, the processor 21 confirms whether a setting command is received. If a setting command is not received (NO in Act 23), the processor 21 returns to Act 22. In this way, in Act 22 and Act 23, the processor 21 waits for one of the cancellation command and the setting command.

If a setting command is received via the communication interface 27 in the waiting state in Act 22 and Act 23 (YES in Act 23), in Act 24, the processor 21 confirms whether a stamp ID is included in the setting command. If the user enters the setting button B4 without selecting the stamp displayed in the stamp region A1, a stamp ID is not included in the setting command. In this case (NO in Act 24), the processor 21 returns to the waiting state in Act 22 and Act 23.

If a stamp ID is included in the setting command (YES in Act 24), in Act 25, the processor 21 searches through the stamp database 9 and acquires stamp data from the data record 9R including the stamp ID. The processor 21 determines whether independent designation or all designation of contents is performed. If a content number other than the content number "0" is included in the setting command, the processor 21 determines that the independent designation is performed. If the content number "0" is included in the setting command, the processor 21 determines that the all designation is performed.

If determining that the independent designation is performed (YES in Act 26), in Act 27, the processor 21 searches through the editing table 221 and acquires a type code of a type code area corresponding to the content number included in the setting command. In Act 28, the processor 21 determines whether the type code is a stamp target code.

In this embodiment, a stamp is not superimposed and displayed on a moving image. Stamps can be superimposed and displayed on contents other than the moving image, for example, a still image and a template. In this case, a stamp target flag is not set for a type code indicating the moving image in advance. Stamp target flags are set for type codes indicating the still image and the template other than the moving image. Stamp target flags for respective codes are stored in the main memory 22.

If a stamp target flag is set for the type code (YES in Act 28), in Act 29, the processor 21 adds stamp data to a stamp data area corresponding to a relevant content number of the editing table 221. The processor 21 sets, in a center coordinate area, a center coordinate of a rectangular frame in which content is displayed, sets a rotation angle of 0 degree in a rotation angle area, and sets 100% in a size area. Thereafter, the processor 21 proceeds to processing in Act 41 in FIG. 11.

On the other hand, if a stamp target flag is not set for the type code (NO in Act 28), the processor 21 skips processing in Act 29. The processor 21 proceeds to the processing in Act 41 in FIG. 11.

On the other hand, if determining in Act 26 that the all designation is performed (NO in Act 26), in Act 30, the processor 21 resets a counter k to "0". The counter k is stored in the main memory 22. Subsequently, in Act 31, the processor 21 counts up the counter k by "1". In Act 32, the processor 21 determines whether the counter k is equal to or smaller than a maximum value n of the content number stored in the editing table 221. If the counter k is equal to or smaller than the maximum value n of the content number (YES in Act 32), in Act 33, the processor 21 acquires a type code in which the content number is k. In Act 34, the processor 21 determines whether the type code is a stamp target code.

As explained about Act 28, if a stamp target flag is set for the type code (YES in Act 34), in Act 35, the processor 21 adds stamp data to a stamp data area corresponding to a relevant content number of the editing table 221. The processor 21 sets, in a center coordinate area, a center coordinate of a rectangular frame in which content is displayed, sets a rotation angle of 0 degree in a rotation angle area, and sets 100% in a size area. If a stamp target flag is not set for the type code in Act 34, the processor 21 skips the processing in Act 35. Thereafter, the processor 21 returns to Act 31 and further counts up the counter k by "1". If the counter k is equal to or smaller than the maximum value n of the content number (YES in Act 32), the processor 21 executes processing in Act 33 to Act 35.

Figure 11:
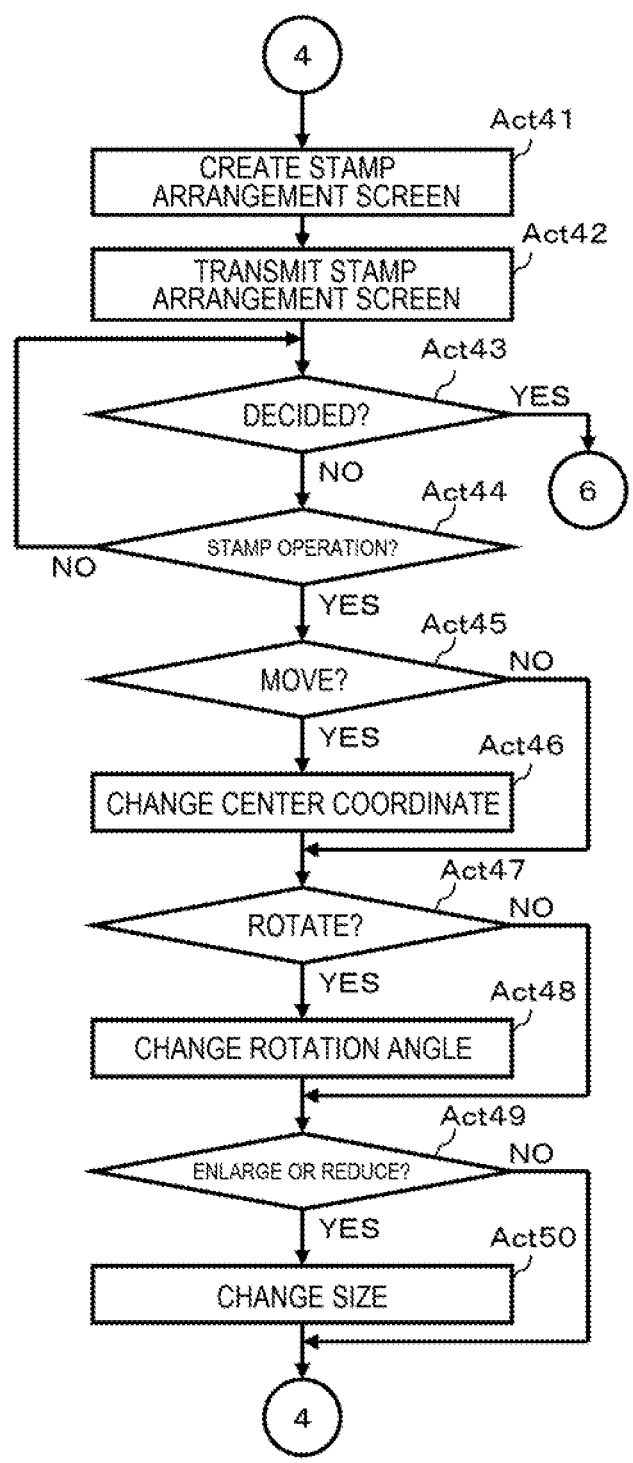
FIG. 11 is a flowchart illustrating the essential procedure of the information processing executed by the processor of the server according to the control program.

If the counter k exceeds the maximum value n of the content number in Act 32 (NO in Act 32), the processor 21 proceeds to Act 41 in FIG. 11.

In Act 41, the processor 21 creates a stamp arrangement screen data on the basis of the data of the editing table 221. In Act 42, the processor 21 controls the communication interface 47 to transmit the stamp arrangement screen data to the terminal 4 at a setting command transmission source. The stamp arrangement screen data is transmitted from the communication interface 47 to the terminal 4 according to the control. Consequently, a stamp arrangement screen S3 (see FIG. 16) or a stamp arrangement screen S4 (see FIG. 17) is displayed on the display device 46 of the terminal 4.

Figure 16:
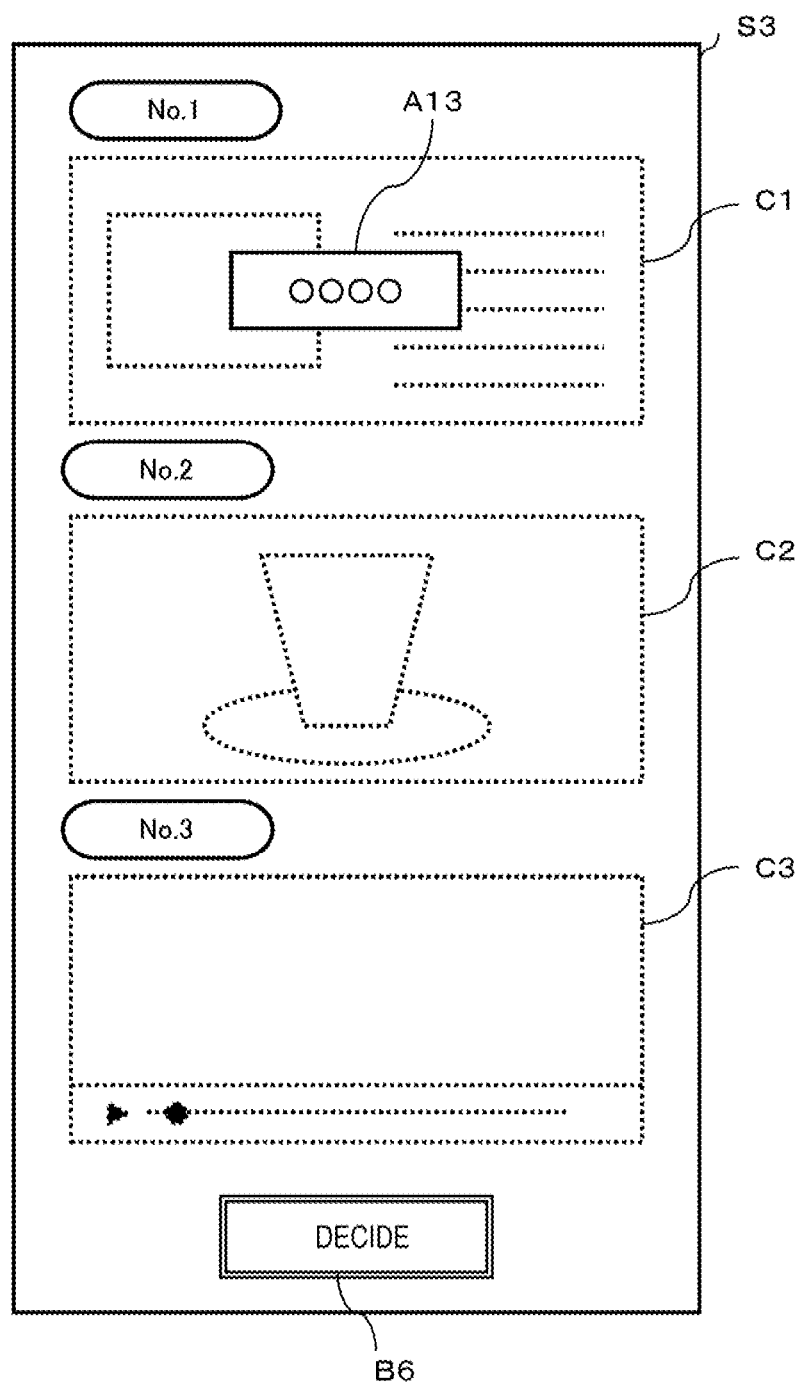
FIG. 16 is a schematic diagram illustrating an example of a stamp arrangement screen.

FIG. 16 is the stamp arrangement screen S3 displayed if, on the setting screen S2 in FIG. 15 displayed if the stamp button B1 is entered on the editing screen S1 in FIG. 14, the user selects the stamp A13 from the stamp region A1 and selects the number button of the content number "1" in the radio button region A2. As illustrated in FIG. 16, the same contents C1, C2, and C3 as the contents C1, C2, and C3 on the editing screen S1 and a decision button B6 are displayed on the stamp arrangement screen S3. The stamp A13 is displayed in the center of a frame in which the content C1 is displayed. The contents C1, C2, and C3 are blurred and displayed. Consequently, the stamp A13 is conspicuously displayed. In FIG. 16, the contents C1, C2, and C3 are indicated by broken lines to indicate that the contents C1, C2, and C3 are blurred and displayed.

Figure 17:
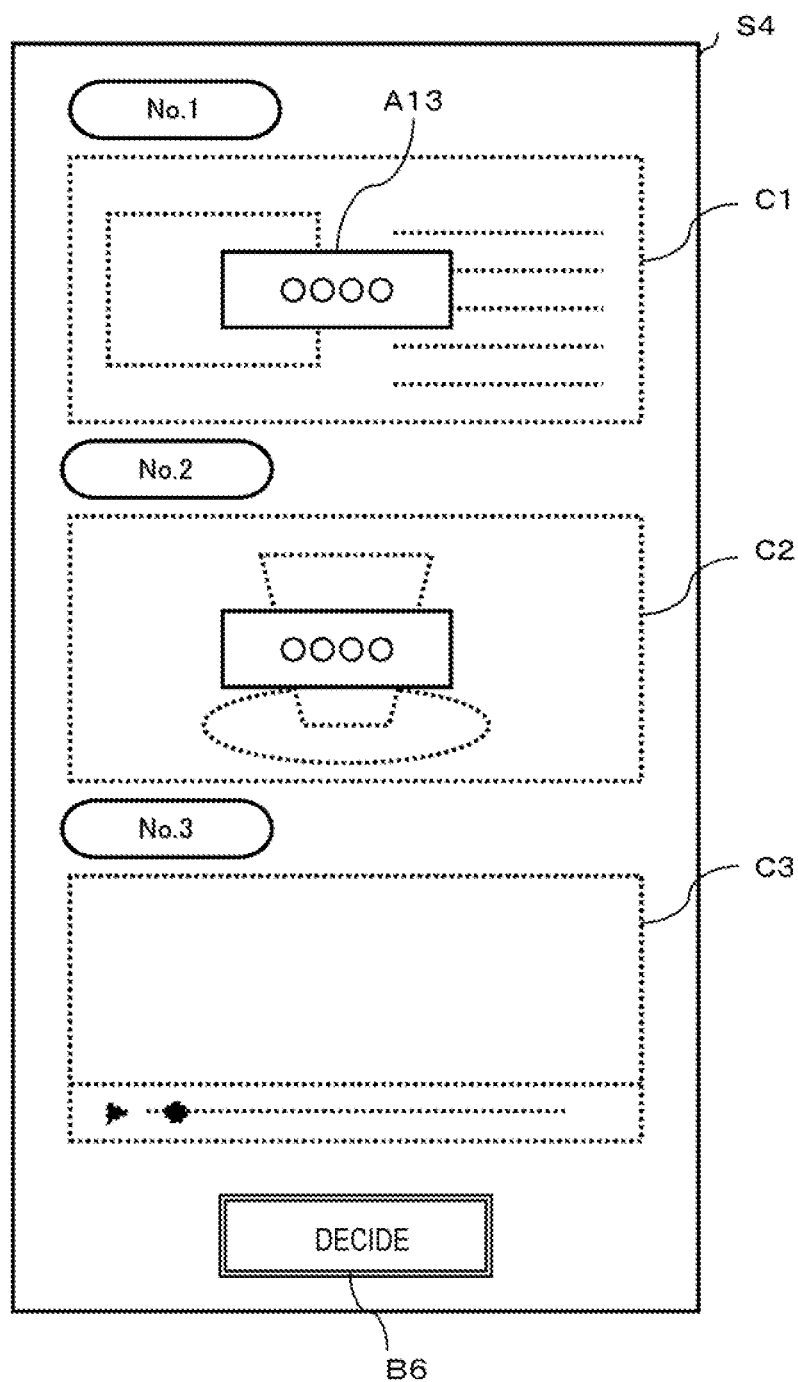
FIG. 17 is a schematic diagram illustrating an example of the stamp arrangement screen.

FIG. 17 is the stamp arrangement screen S4 displayed if the stamp A13 is selected from the stamp region A1 on the setting screen S2 and the ALL button is further selected in the radio button region A2 on the setting screen S2. As illustrated in FIG. 17, the same contents C1, C2, and C3 as the contents C1, C2, and C3 on the editing screen S1 and the decision button B6 are displayed on the stamp arrangement screen S4. The stamps A13 are respectively displayed in the centers of frames in which the content C1 and the content C2 are displayed. On the other hand, since the type of the content C3 is the moving image, the stamp A13 is not displayed. In this case, the contents C1, C2, and C3 are also blurred and displayed.

According to an operation input of the input device 45 by the user, the stamp A13 displayed on the stamp arrangement screens S3 and S4 can slide or rotate in a frame of content on which the stamp A13 is superimposed and displayed. The stamp A13 can be reduce and enlarged.

If the user performs an operation input in order to change the position, the angle, and the size of the stamp A13, a stamp operation command including data of the change is transmitted from the terminal 4 to the server 2.

In Act 43, the processor 21 that transmits the stamp arrangement screen data in Act 42 confirms whether a confirmation command is received. If a confirmation command is not received (NO in Act 43), in Act 44, the processor 21 confirms whether a stamp operation command is received. If a stamp operation command is not received (NO in Act 44), the processor 21 returns to Act 43. In this way, in Act 43 and Act 44, the processor 21 waits for one of the confirmation command and the stamp operation command.

If a stamp operation command is received in the waiting state in Act 43 and Act 44 (YES in Act 44), in Act 45, the processor 21 confirms whether change data indicating a movement amount is included in the command. If change data indicating a movement amount is included (YES in Act 45), in Act 46, the processor 21 changes a center coordinate with respect to the stamp data of the editing table 221 by the movement amount. If change data indicating a movement amount is not included (NO in Act 45), the processor 21 does not execute the processing in Act 46.

Subsequently, in Act 47, the processor 21 confirms whether change data indicating a rotation amount is included in the command. If change data indicating a rotation amount is included (YES in Act 47), in Act 48, the processor 21 changes a rotation angle with respect to the stamp data of the editing table 221 by the rotation amount. If change data indicating a rotation amount is not included (NO in Act 47), the processor 21 does not execute the processing in Act 48.

Subsequently, in Act 49, the processor 21 confirms whether change data indicating a ratio of enlargement or reduction is included in the command. If change data indicating a ratio of enlargement or reduction is included (YES in Act 49), in Act 50, the processor 21 changes a size with respect to the stamp data of the editing table 221 by the ratio. If change data indicating a ratio of enlargement or reduction is not included (NO in Act 49), the processor 21 does not execute the processing in Act 50.

Thereafter, the processor 21 returns to Act 41. The processor 21 executes the processing in Act 41 and subsequent acts as explained above.

Figure 18:
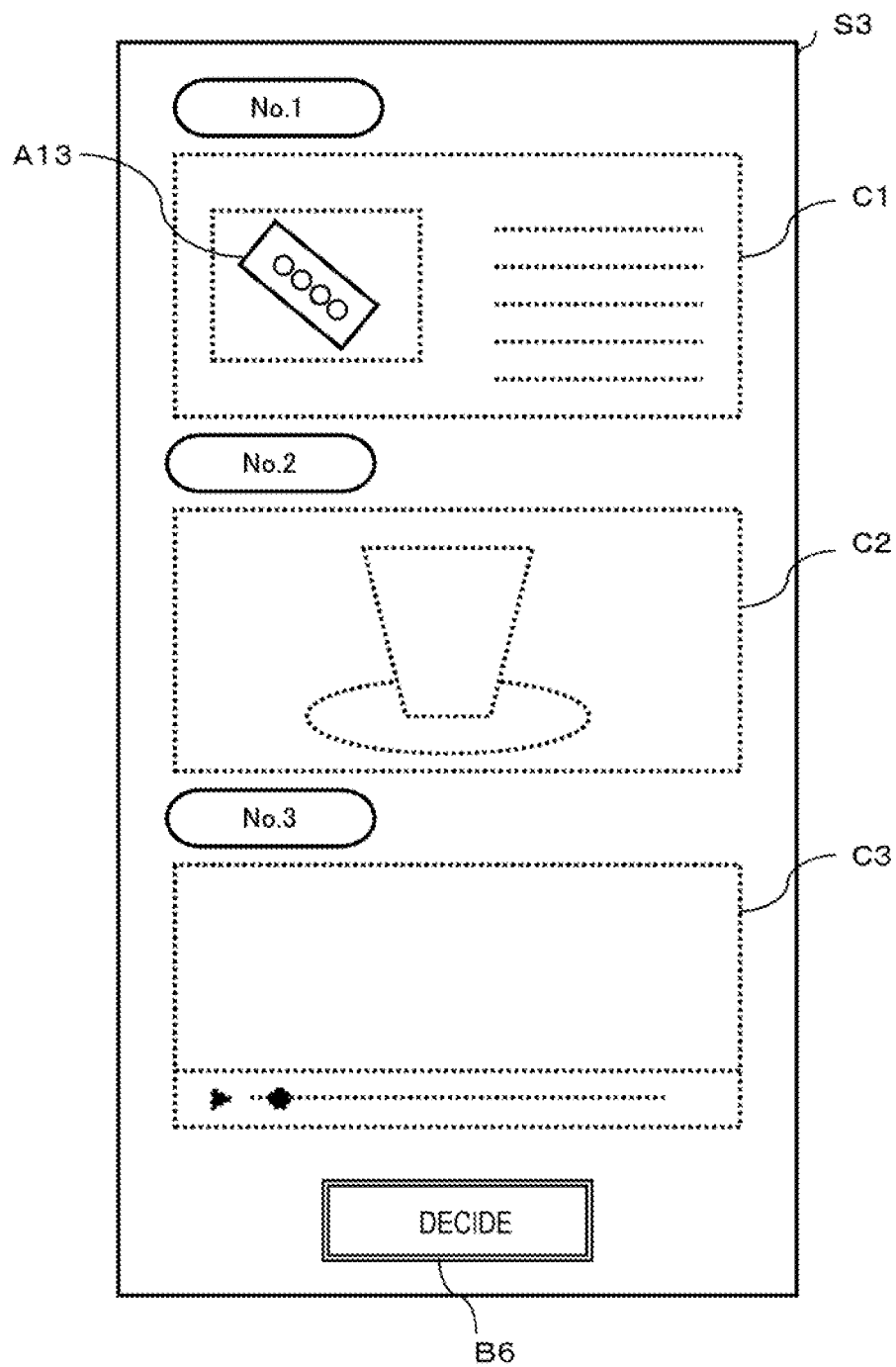
FIG. 18 is a schematic diagram illustrating an example of the stamp arrangement screen.

Therefore, for example, if the user moves the stamp A13 superimposed and displayed on the content C1 in the left direction in FIG. 16 and further rotates the stamp A13 clockwise to reduce the stamp A13 on the stamp arrangement screen S3 in FIG. 16, the stamp arrangement screen S3 changes as illustrated in FIG. 18 according to the processing in Act 41 and Act 42.

If the user finishes to adjust the position, the size, and the like of the stamp A13 viewing the stamp arrangement screens S3 and S4 in this way, the user enters the decision button B6. If the decision button B6 is entered, a confirmation command is transmitted from the terminal 4 to the server 2.

Figure 19:
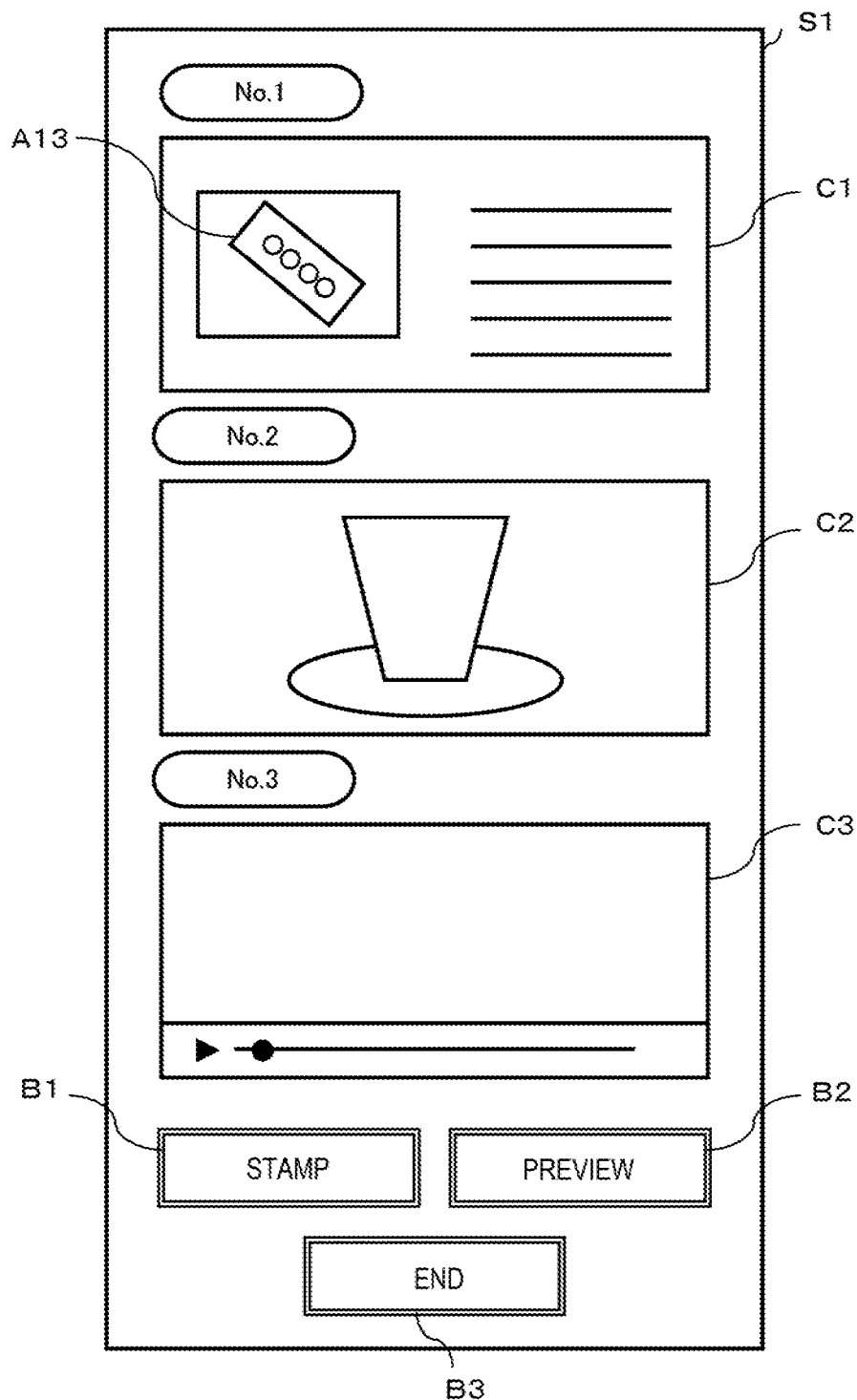
FIG. 19 is a schematic diagram illustrating an example of an editing screen.

If detecting that a decision command is received in the waiting state in Act 43 and Act 44 (YES in Act 43), the processor 21 returns to Act 6 in FIG. 9. That is, the processor 21 creates editing screen data on the basis of the data of the editing table 221 and controls the communication interface 47 to transmit the editing screen data to the terminal 4. Therefore, in this case, the editing screen S1 illustrated in FIG. 19 is displayed on the display device 46 of the terminal 4.

If the user desires to delete the stamp A13 superimposed and displayed on the content C1, the user operates the input device 45 to enter the stamp button B1. Then, since the setting screen in FIG. 15 is displayed, the user operates the input device 45 to select the stamp regions A1 to the stamp A13 and enter the cancellation button B5. If the cancellation button B5 is entered, a cancellation command is transmitted from the terminal 4 to the server 2. A stamp ID of the stamp A13 selected in the stamp region A1 is included in the cancellation command.

Figure 12:
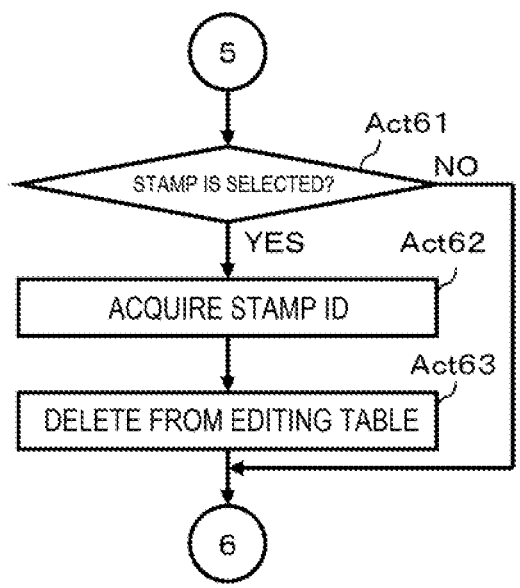
FIG. 12 is a flowchart illustrating the essential procedure of the information processing executed by the processor of the server according to the control program.

If a cancellation command is received in the waiting state in Act 22 and Act 23 in FIG. 10 (YES in Act 22), the processor 21 proceeds to Act 61 in FIG. 12. In Act 61, the processor 21 confirms whether a stamp is selected, that is, a stamp ID is included in the cancellation command. If a stamp ID is not included (NO in Act 61), the processor 21 returns to Act 6 in FIG. 9.

If a stamp ID is included (YES in Act 61), in Act 62, the processor 21 acquires the stamp ID. In Act 63, the processor 21 deletes, from the editing table 221, data of stamp data, a center coordinate, a rotation angle, and a size associated with the stamp ID. Thereafter, the processor 21 returns to Act 6 in FIG. 9. In this way, the editing screen S1 illustrated in FIG. 14 is displayed on the display device 46 of the terminal 4.

If the user desires to confirm a preview of display on the signage terminal 3 in a state in which the editing screen S1 is displayed on the display device 46 of the terminal 4, the user operates the input device 45 to enter the preview button B2. If the preview button B2 is entered, a preview command is transmitted from the terminal 4 to the server 2.

Figure 13:
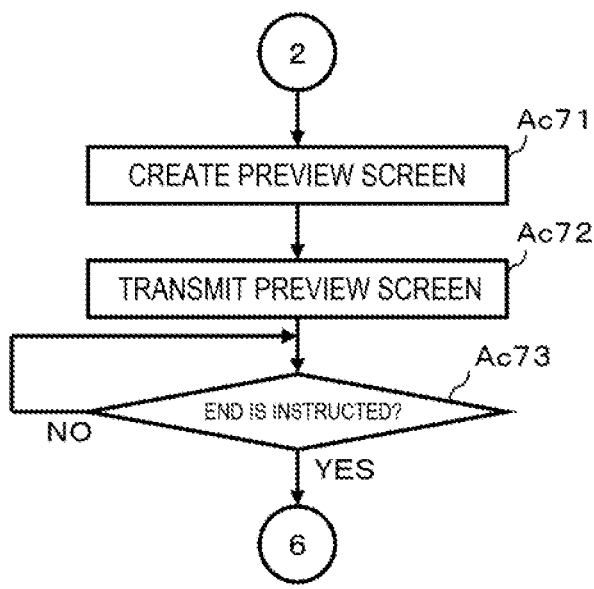
FIG. 13 is a flowchart illustrating the essential procedure of the information processing executed by the processor of the server according to the control program.

If a preview command is received in the waiting state in Act 8 to Act 10 in FIG. 9 (YES in Act 9), the processor 21 proceeds to Act 71 in FIG. 13. In Act 71, the processor 21 creates preview screen data on the basis of the data of the editing table 221. The preview screen data is data of a screen for reproducing contents for reproduction times in the order of content numbers. At this time, if stamp data is set for the content numbers, stamps are superimposed and displayed on the contents. The stamps are displayed in positions based on center coordinates, rotation angles, and sizes.

In Act 72, the processor 21 controls the communication interface 27 to transmit the preview screen data to the terminal 4 at a preview command transmission source. The preview screen data is transmitted from the communication interface 27 to the terminal 4 according to the control. As a result, a preview screen is displayed on the display device 46 of the terminal 4. The preview screen is the same as a screen displayed on the signage terminal 3. The user confirming the preview screen operates the input device 45 to perform an end instruction. If the end instruction is performed, an end instruction command is transmitted from the terminal 4 to the server 2.

In Act 73, the processor 21 that transmits the preview screen data waits for an end instruction command. If an end instruction command is received via the communication interface 27 (YES in Act 73), the processor 21 returns to Act 6 in FIG. 9.

If ending the editing work of the stamp for the content in a state in which the editing screen S1 is displayed on the display device 46 of the terminal 4, the user operates the input device 45 to enter the end button B3. If the end button B3 is entered, an editing end command is transmitted from the terminal 4 to the server 2.

If an editing end command is received in the waiting state in Act 8 to Act 10 in FIG. 9 (YES in Act 10), in Act 11, the processor 21 transmits the data of the editing table 221 to the signage terminal 3 identified by the signage ID acquired in Act 2 in FIG. 9. The processor 21 ends the information processing conforming to the control program.

In the signage terminal 3 that receives the data of the editing table 221, the contents are reproduced in order on the basis of the data of the editing table 221. That is, the content related to the content data of the content number "1" is displayed for the reproduction time and, subsequently, the content related to the content data of the content number "2" is displayed for the reproduction time. At this time, on the contents of the content numbers for which the stamp data is set, stamps of the stamp data are superimposed and displayed.

The computer mainly including the processor 21 of the server 2 configures a selecting unit by executing the processing in Act 24 and Act 25 in FIG. 19. The computer configures a setting unit by executing the processing in Act 29 to Act 35 in FIG. 10. In detail, the computer configures a first setting unit by executing the processing in Act 29 and configures a second setting unit by executing the processing in Act 30 to Act 35. The computer configures an output unit by executing the processing in Act 11 in FIG. 9. The computer configures an adjusting unit by executing the processing in Act 44 to Act 50 in FIG. 11. The computer configures a preview unit by executing the processing in Act 71 and Act 72 in FIG. 13.

In this way, with the content providing system 1 in this embodiment, the user can superimpose and display a desired stamp on content displayed on the signage terminal 3 with simple operation of the terminal 4. Therefore, for example, if a commodity displayed as content of an advertisement image is sold out, the user can superimpose and display, on a real time basis, a stamp indicating "sold-out" on the content. For example, if a commodity displayed as content of an advertisement image is provided as a time-limit sale product, the user can superimpose and display, on a real time basis, a stamp indicating "time-limit sale" on the content.

In this case, a position where the stamp is displayed can be optionally changed if the position is present on the content. The stamp can also be rotated and enlarged or reduced. Therefore, the stamp can be easily superimposed and displayed in an optimum position in connection with a commodity image displayed as content.

According to whether a radio button is selected on the setting screen S2, a stamp can be displayed for anyone content among a plurality of contents or the same stamp can be displayed for all the contents. Therefore, the stamp can be easily changed for each content and the same stamp can be easily superimposed and displayed. Moreover, for example, a stamp can be set not to be displayed for a moving image. Therefore, measures can be easily taken for operation in which a stamp is not displayed on a moving image because content becomes unclear if the stamp is displayed on the moving image.

The display device 46 of the terminal 4 has a function of displaying, as a preview, content displayed on the signage terminal 3. Therefore, with the preview display function, the user can confirm editing content of a stamp before the editing content is expanded on the signage terminal 3.

The content providing apparatus according to at least one embodiment is explained above. However, the at least one embodiment is not limited to the content providing apparatus and can be variously modified and implemented.

In at least one embodiment, the terminal 4 is illustrated as the input device operated by the user. The input device is not limited to the terminal 4. For example, if an image display unit of the signage terminal 3 is a touch panel, a region of a part of the image display unit is configured to play the same functions as the functions of the input device 45 and the display device 46 of the terminal 4. Consequently, the user can superimpose and display additional information in any position of content displayed on the signage terminal 3 by operating the signage terminal 3.

In at least one embodiment, the example is explained in which a stamp is not superimposed and displayed on a moving image. A type of content on which the stamp is not superimposed and displayed is not limited to the moving image and may be, for example, a template. The stamp may be superimposed and displayed irrespective of a type of content. In this case, the processing in Act 28 and Act 34 in FIG. 10 is omitted.

The stamp is not limited to the image information, the animation information or the moving image information, the voice information, the sound information, and the like. For example, if a display of the signage terminal 3 is a touch panel, selection instruction operation on the touch panel being discriminated and reproduced as voice or reproduced as a moving image is also a type of the stamp.

In at least one embodiment, the example is explained in which one kind of additional information (stamp) is superimposed and displayed on one content. Concerning this point, two or more kinds of additional information may be superimposed and displayed on one content. For example, stamps of "sold-out" can be respectively displayed on a plurality of contents on which stamps of "time-limit sale product" are already displayed.

At least one embodiment is explained above. However, the at least one embodiment is presented as an example and is not intended to limit the scope of the invention. This new embodiment can be implemented in other various forms. Various omissions, substitutions, and changes can be performed without departing from the spirit of the invention. At least one embodiment and modifications of the at least one embodiment are included in the scope and the gist of the invention and included in the inventions described in claims and the scope of equivalents of the inventions.

What is claimed is:

1. A content providing apparatus comprising:
   at least one computer configured to:
   transmit, to a terminal, content and additional information to be overlapped with the content;
   receive, from the terminal, first information that selects the additional information and position information of the additional information to overlap the content;
   select the additional information while being superimposed on the content output to a display based on the first information that selects the additional information; and
   set the additional information selected by the terminal in a position overlapping the content based on the position information; and
   an output configured to output the content, for which the additional information is set, to the display according to a playlist.

2. The content providing apparatus according to claim 1, wherein the at least one computer is configured to:
   receive second information that reduces, enlarges, or rotates the additional information; and
   reduce, enlarge, or rotate the additional information in the position overlapping the content based on the second information that reduces, enlarges, or rotates the additional information.

3. The content providing apparatus according to claim 1, wherein the at least one computer is further configured to:
   transmit a plurality of contents to the terminal, the plurality of contents including the content;
   receive third information that designate the content; and
   set the additional information for the content based on the third information that designate the content.

4. The content providing apparatus according to claim 3, wherein if the third information that designates the content is information designated all of the plurality of contents, the at least one computer is configured to set the additional information for all of the plurality of contents excluding content of a predetermined type among the plurality of contents output to the display in order.

5. The content providing apparatus according to claim 1, wherein the at least one computer is further configured to cause a display medium of the terminal to display a preview image of the content for which the additional information is set.

6. The content providing apparatus according to claim 1, wherein the additional information includes a stamp.

7. The content providing apparatus according to claim 6, wherein the stamp includes at least one of animation information, moving image information, voice information or sound information.

8. The content providing apparatus according to claim 1, wherein the at least one computer is at least one computer of a server.

9. A content providing apparatus comprising:
   a terminal; and
   a server configured to communicate with the terminal and comprising:
   at least one computer configured to:
   transmit, to the terminal, content and additional information to be overlapped with the content;
   receive, from the terminal, first information that selects the additional information and position information of the additional information to overlap the content;
   select the additional information while being superimposed on the content output to a display based on the first information that selects the additional information; and
   set the additional information selected by the terminal in a position overlapping the content based on the position information; and an output configured to output the content, for which the additional information is set, to the display according to a playlist.

10. The content providing apparatus according to claim 9, wherein the at least one computer is configured to:
receive second information that reduces, enlarges, or rotates the additional information; and
reduce, enlarge, or rotate the additional information in the position overlapping the content based on the second information that reduces, enlarges, or rotates the additional information.

11. The content providing apparatus according to claim 9, wherein the at least one computer is further configured to:
transmit a plurality of contents to the terminal, the plurality of contents including the content;
receive third information that designate the content; and
set the additional information for the content based on the third information that designate the content.

12. The content providing apparatus according to claim 11, wherein if the third information that designates the content is information designated all of the plurality of contents, the at least one computer is configured to set the additional information for all of the plurality of contents excluding content of a predetermined type among the plurality of contents output to the display in order.

13. The content providing apparatus according to claim 9, wherein the at least one computer is further configured to cause a display medium of the terminal to display a preview image of the content for which the additional information is set.

14. The content providing apparatus according to claim 10, wherein the additional information includes a stamp.

15. The content providing apparatus according to claim 10, wherein the stamp includes at least one of animation information, moving image information, voice information or sound information.

16. A method comprising:
transmitting, to a terminal, content and additional information to be overlapped with the content;
receiving, from the terminal, first information that selects the additional information and position information of the additional information to overlap the content;
selecting the additional information while being superimposed on the content output to a display based on the first information that selects the additional information;
setting the selected additional information in a position overlapping the content based on the position information; and
outputting the content, for which the additional information is set, to the display according to a playlist.

17. The method according to claim 16, further comprising:
receiving second information that reduces, enlarges, or rotates the additional information; and
reducing, enlarging, or rotating the additional information in the position overlapping the content based on the second information that reduces, enlarges, or rotates the additional information.

18. The method according to claim 16, further comprising:
transmitting a plurality of contents to the terminal, the plurality of contents including the content;
receiving third information that designate the content; and
setting the additional information for the content based on the third information that designate the content.

19. The method according to claim 18, further comprising if the information that designates the content is information designated all of the plurality of contents, setting the additional information for all of the plurality of contents excluding content of a predetermined type among the plurality of contents output to the display in order.

20. The method according to claim 16, further comprising causing a display medium of the terminal to display a preview image of the content for which the additional information is set.

* * * * *